(12) United States Patent
Parsa et al.

(10) Patent No.: US 7,133,508 B1
(45) Date of Patent: Nov. 7, 2006

(54) PREPAID LONG DISTANCE CALL SYSTEM AND METHOD

(75) Inventors: Ferial Parsa, Paradise Valley, AZ (US); Brent V. Bell, Tempe, AZ (US); Gloria E. Davy, Phoenix, AZ (US); John T. Peketz, Scottsdale, AZ (US); Martin R. Marks, Phoenix, AZ (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/565,311

(22) Filed: May 4, 2000

(51) Int. Cl.
H04M 15/00 (2006.01)
H04M 7/00 (2006.01)

(52) U.S. Cl. .................... 379/114.15; 379/144.01; 379/115.01; 379/121.01; 379/221.02

(58) Field of Classification Search ............... 379/111, 379/112.01, 114.01, 114.09, 114.14, 115.01, 379/115.02, 120, 121.01, 127.01, 127.02, 379/128, 130–134, 139, 219–221.02, 144.01, 379/114.15, 114.17, 114.2, 114.28, 127.03, 379/127.04
See application file for complete search history.

(56) References Cited

U.S. PATENT DOCUMENTS

| 5,621,787 A * | 4/1997 | McKoy et al. ......... 379/121.06 |
| 5,781,620 A * | 7/1998 | Montgomery et al. |
| 6,137,872 A * | 10/2000 | Davitt et al. |
| 6,195,422 B1 * | 2/2001 | Jones et al. ............. 379/127.05 |
| 6,333,976 B1 * | 12/2001 | Lesley |
| 2001/0028705 A1 * | 10/2001 | Adams et al. ........... 379/114.2 |

* cited by examiner

*Primary Examiner*—Quoc Tran
(74) *Attorney, Agent, or Firm*—Townsend and Townsend and Crew LLP

(57) ABSTRACT

A subscriber's line is associated with a prepaid long distance account. When the subscriber attempts a long distance call, it is determined from the dialed digits whether the attempted call is a long distance call. If a long distance call is attempted, the subscriber's prepaid account is checked to determine whether it has any remaining credits. If no credits are remaining, the subscriber is so informed, and the call is disconnected. If the subscriber has credits remaining, the call is connected as long as credits are remaining in the prepaid account.

42 Claims, 3 Drawing Sheets

PREPAID LONG DISTANCE CALL SYSTEM AND METHOD

BACKGROUND OF THE INVENTION

The present invention relates to a system and method for providing prepaid long distance calls, and more particularly, to a system and method for providing prepaid long distance service in an Advanced Intelligent Network (AIN).

In a traditional long distance service billing arrangement, the customer is billed after the calls are made. However, this traditional billing arrangement may not be available to a customer with a poor credit rating or who has failed to pay long distance bills in the past.

One currently available option for this customer is to purchase a prepaid calling card, which permits the user to make telephone calls for a predetermined number of minutes. Prepaid calling cards each include a unique i.d. number. In order to use the prepaid calling card, the user first dials the long distance carrier (typically, an 800 number). The user then enters the i.d. number from the calling card and the telephone number that the user is attempting to call. If there are remaining minutes associated with that i.d. number, the call is connected. When the minutes associated with the i.d. number on the calling card are exhausted, the call is ended and the i.d. number cannot be used again to place a call. The user discards the spent prepaid calling card and must purchase a new calling card with a new i.d. number in order to make additional long distance calls. The number of minutes associated with a specific i.d. number is not replenished.

SUMMARY OF THE INVENTION

The present invention provides a system and method for providing prepaid long distance service, especially in an Advanced Intelligent Network. In the present invention, a prepaid long distance account is associated with the subscriber's line, such that long distance calls from the subscriber's line are automatically deducted from the prepaid account.

As implemented in an AIN network, when the subscriber originates a call, the Switching Service Point (SSP) detects an Off-Hook Delay (OHD) trigger, collects dialed digits and queries the Services Control Point (SCP) to determine whether the attempted call is local or long distance (toll). The subscriber's prepaid account is then checked to determine remaining credits (money or minutes). If credit is remaining, the subscriber's call is connected. As the call continues, credits are deducted from the prepaid account. When the credits are exhausted, the call is disconnected. Preferably, periodic announcements during the call (to the subscriber only) indicate the amount of the remaining credits.

In one embodiment, the SSP routes the subscriber's call using the long distance carrier selected by the subscriber to the prepaid platform upon a determination that the attempted call is a long distance call. The prepaid platform connects the call using the long distance carrier selected by the subscriber and monitors credits in the subscriber's account.

In a second embodiment, the subscriber's account is stored at the SCP, which monitors the remaining credits in the subscriber's account as the call continues and instructs the SSP to disconnect the call upon expiration of the subscriber's credits. If credits are available, the long distance call is connected using the subscriber's selected long distance carrier.

DETAILED DESCRIPTION OF PREFERRED EMBODIMENTS

Figure 1:
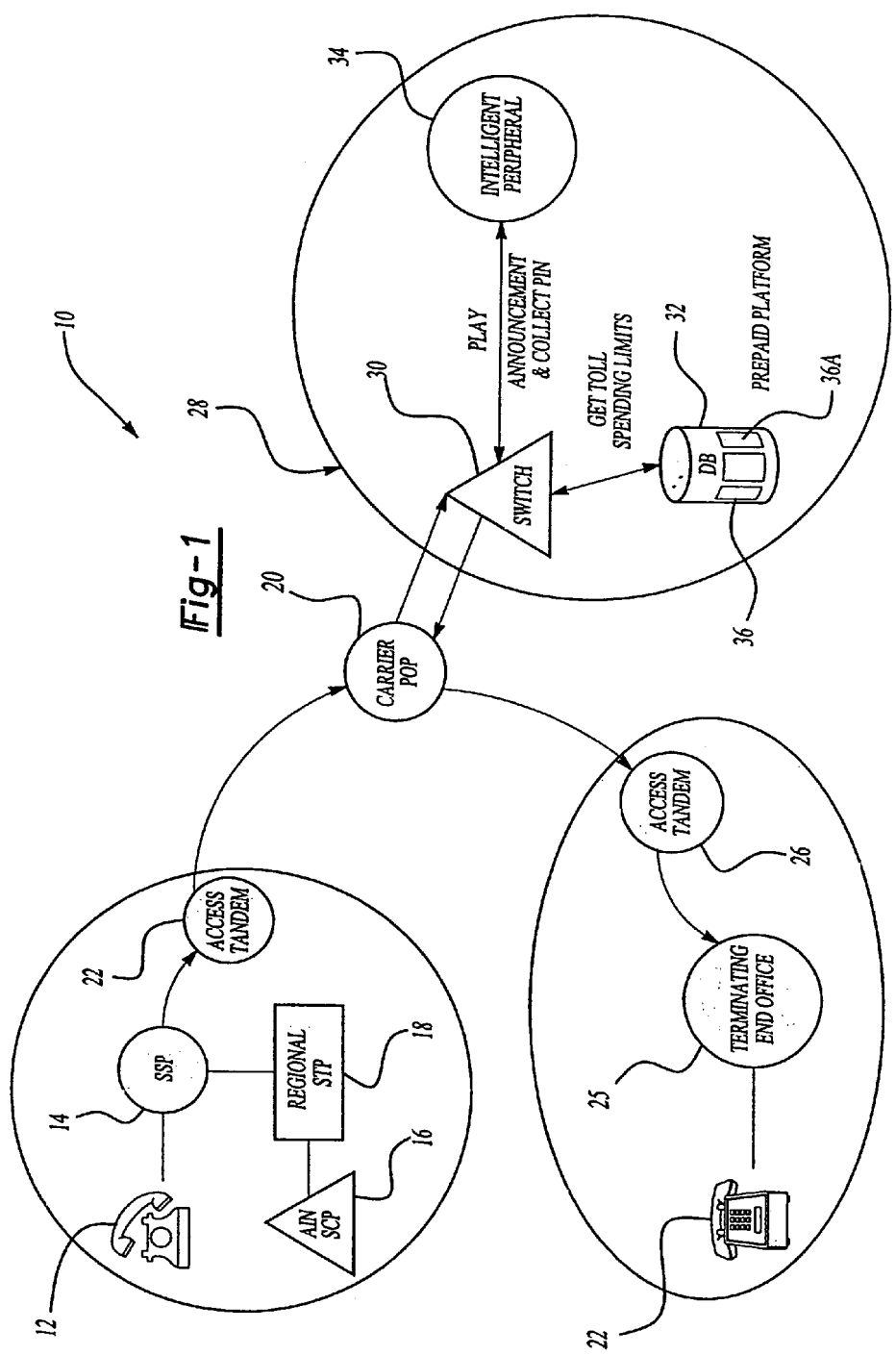
FIG. 1 is a schematic showing a first embodiment of the inventive system for providing a prepaid long distance account according to the present invention.

FIG. 1 is a schematic of a first embodiment implementing the prepaid long distance system 10 of the present invention in an Advanced Intelligent Network (AIN). As shown in FIG. 1, the prepaid long distance system 10 of the present invention includes a subscriber line 12 connected by local telephone lines to a Service Switching Point (SSP) 14. The SSP 14 is a well-known AIN programmable switch which recognizes numerous different AIN triggers on the subscriber line 12. In response to the various triggers, the SSP 14 queries the Service Control Point (SCP) 16 via a Signaling Transfer Point (STP) 18 for instructions regarding call routing or call processing. The SSP 14 selectively connects the subscriber line 12 to the subscriber's selected long distance carrier POP 20 via access tandem 22. The called party line 22 is also connected to a terminating end office 25 (which may be an SSP). The called party's line 22 is also connected to the carrier POP 20 via an access tandem 26.

The long distance carrier POP 20 is connected via dedicated trunks to a Prepaid Long Distance (PLD) platform 28. The PLD platform 28 includes an intelligent switch 30 connecting the long distance carrier POP 20 to a database 32 and intelligent peripheral 34. The database 32 stores a plurality of accounts 36, including an account 36a associated with the subscriber's line 12. Each account 36 includes credits (in terms of money or minutes) which are prepaid by the subscriber and used by the subscriber for long distance calls. The accounts 36 are periodically replenished by the prepaid platform when the subscriber makes payment to the local service provider, who in turn pays the long distance carrier. The intelligent peripheral 34 announces the credits remaining (preferably to the subscriber only) and gives warnings on the subscriber's line 12 before the credits are exhausted. The accounts 36 in the database 32 are monitored by the intelligent switch 30, which also controls the intelligent peripheral 34.

The operation of the elements in FIG. 1 will be described in more detail with respect to the flow chart in FIG. 2. Where necessary, the components in FIG. 1 are programmed to perform the functions described herein.

Figure 2:
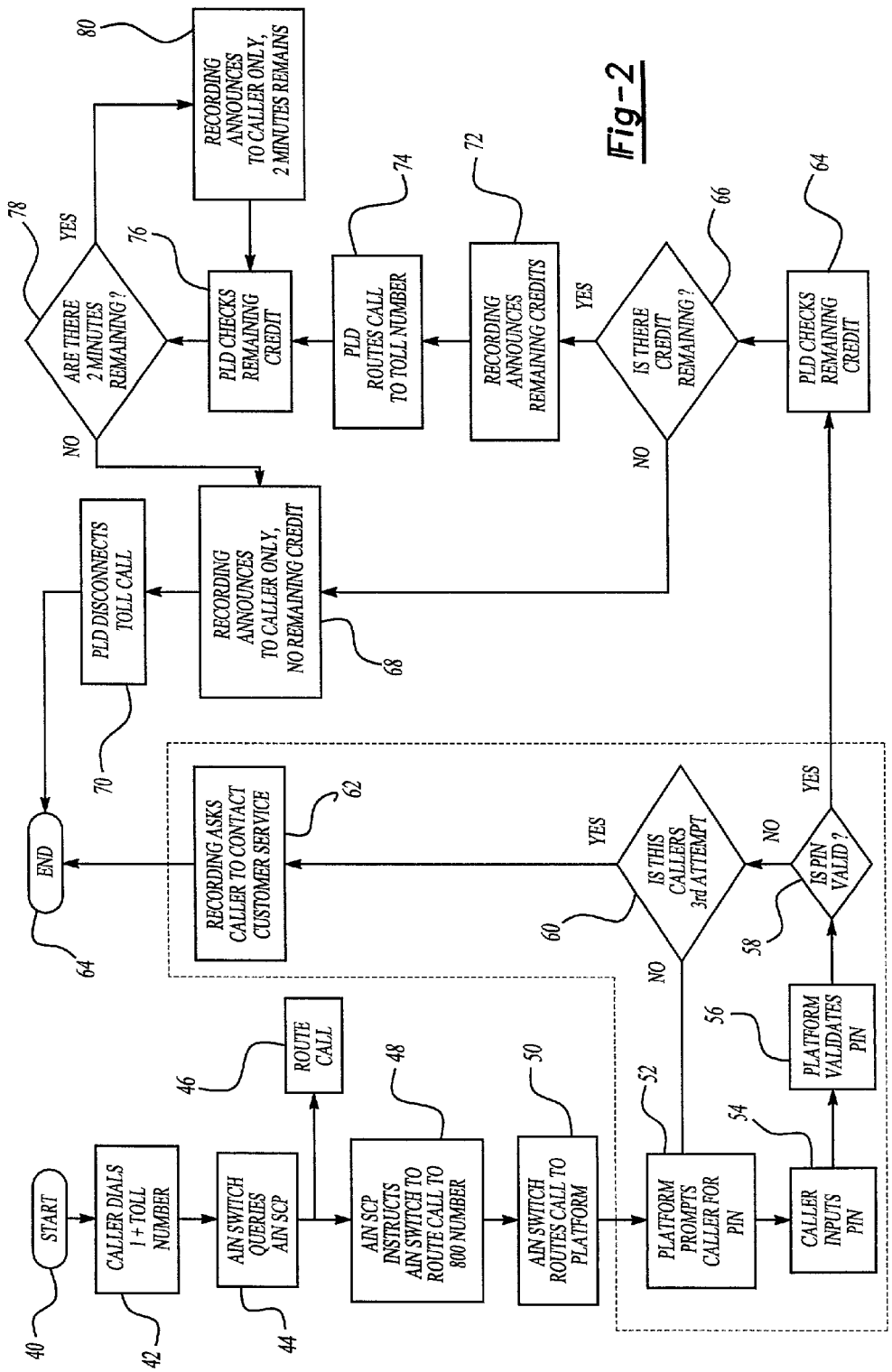
FIG. 2 is a flow chart indicating operation of the system of FIG. 1 in accordance with a method of the present invention.

In FIG. 2, after start 40, the subscriber dials "1" plus a long distance number (in this example, associated with the called party's line 22) on subscriber line 12 in step 42 while the SSP 14 detects the Off-Hook Delay (OHD) trigger on subscriber line 12 and collects the dialed digits. In step 44, the SSP 14 determines that the subscriber line 12 is associated with the prepaid long distance service and sends a query including the dialed digits to the SCP 16 to determine whether the attempted call is a long distance call.

If the SCP 16 determines that the call is a local call, the SCP 16 instructs the SSP 14 to route the call in step 46. If the call is a long distance call, the SCP 16 instructs the SSP 14 to route the call to the long distance carrier POP 20 via a toll free number in step 48. In step 50, in response to the instruction from the SCP 16, the SSP 14 connects the subscriber's line 12 to the long distance carrier POP 20. The SSP 14 also sends to the long distance carrier POP 20 the telephone number associated with the subscriber's line 12 and the digits collected by the SSP 14 from subscriber's line 12 after the OHD trigger.

Steps 52–62 are optional and add a level of security for restricting use of the prepaid account 36a associated with the subscriber line 12. In step 52, prepaid platform 28 sends a voice prompt (from the intelligent peripheral 34) to the user requesting entry of a Personal Identification Number (PIN) required to access the associated account 36a. In step 54, the caller inputs a PIN on the subscriber line 12. In steps 56 and 58, the prepaid platform 28 validates the PIN entered by the caller by comparing it to a PIN stored in the database 32 and associated with the account 36a. If the PIN entered by the caller does not match the PIN associated with the account 36a, the caller is again prompted for the PIN in step 52. However, after three attempts in step 60, the caller is asked to contact customer service in step 62 and the call is ended in step 64.

If the PIN is determined to be valid in step 58 (or if no PIN is required), the PLD platform 28 indexes the account 36a in the database 32 utilizing the telephone number associated with the subscriber line 12. The PLD platform 28 checks whether there is any credit remaining in account 36a in step 66. If not, a recording from intelligent peripheral 34 is played on the subscriber line 12 that there is no remaining credit in the associated account 36a and the PLD platform 28 then disconnects the call in step 70.

If it is determined that there is credit remaining in the account 36a in step 66, the intelligent peripheral 34 announces on the subscriber line 12 the amount of the remaining credits in the account 36a in step 72. The prepaid platform 28 routes the call to the called party line 22 using the subscriber's long distance carrier. The long distance carrier POP 20 then routes the call to the called party line 22 (associated with the telephone number dialed on subscriber line 12) in step 74. During the call, the credit in the account 36a is automatically decreased and monitored in step 76 by the PLD platform 28. When it is determined that there are only two minutes remaining (or some other threshold) in step 78, the intelligent peripheral 34 announces on the subscriber line 12 only that there are only two minutes remaining in step 80. Then, when there are no credits remaining, this is announced on the subscriber line 12 in step 68 and the call is disconnected in step 70.

Figure 3:
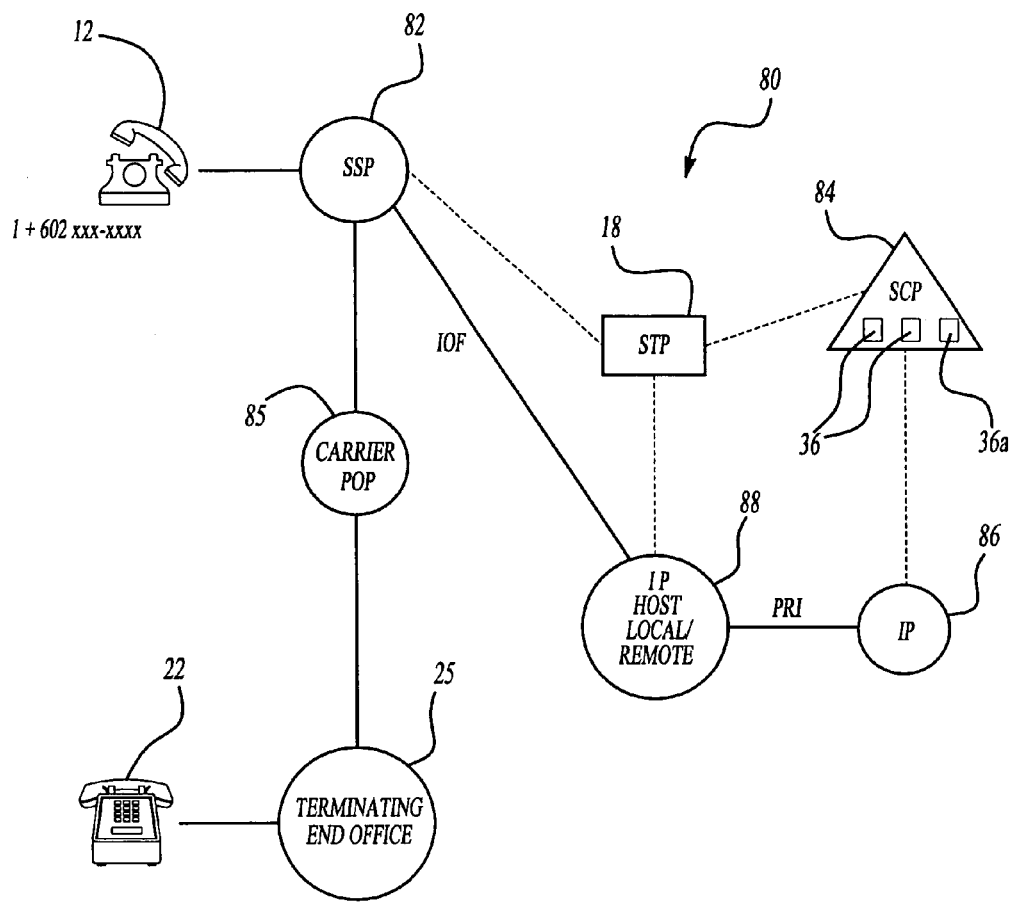
FIG. 3 is a schematic of a second embodiment for providing prepaid long distance according to the present invention.

FIG. 3 illustrates a second embodiment of the prepaid long distance system 80 of the present invention. The network shown in FIG. 3 comprises known AIN architecture elements, with additional programming in the SSP 82 and SCP 84 to perform the present invention. Briefly, the AIN network of FIG. 3 includes a subscriber line 12 connected to an SSP 82. The SSP 82 is connected to an SCP 84 via an STP 18, all as is well known in AIN. The SCP 84 is also connected to an intelligent peripheral (IP) 86, which in turn is connected to the SSP 82 via an IP host local/remote 88.

In this embodiment, the prepaid long distance accounts 36, including the prepaid long distance account 36a associated with subscriber line 12, are stored in the SCP 84 database. Operation of the prepaid long distance system in this embodiment is similar to that of FIGS. 1 and 2. First, the prepaid long distance subscriber originates a call on subscriber line 12. The SSP 82 detects the OHD trigger, collects the dialed digits and queries the SCP 84. The SCP 84, based upon the dialed digits, determines whether the call is local, toll, directory assistance, operator assistance, etc. If the call is local, the SCP 84 instructs the SSP 82 to complete the call as dialed. If the call type is a blocking call type (e.g., 900, 960, 1010-xxxx, etc.), the SCP 84 instructs the SSP 82 to terminate the call to an announcement.

If the call type is long distance, the SCP 84 may instruct the IP 86 to request and collect the subscriber's PIN. The SCP 84 then verifies the PIN and checks the remaining credits in the account 36a associated with subscriber line 12. The SCP 84 indexes the accounts 36 utilizing the telephone number associated with the subscriber line 12 to access the account 36a. If the SCP 84 determines that the subscriber account 36a has no remaining credits, the SCP 84 instructs the IP 86 via STOR (send to outside resource) to play an announcement on subscriber line 12 that they have zero credits remaining in their account 36a, and the SCP 84 instructs the SSP 82 to disconnect the call.

If the SCP 84 determines that there are credits in the account 36a, the SCP 84 instructs the SSP 82 to route the call using the subscriber's selected long distance carrier POP 85. The IP 86 then requests instructions from the SCP 84. In response, the SCP 84 instructs the IP 86 to play an announcement on the subscriber line 12 that they have remaining credits in their account 36a. The SCP 84 then instructs the IP 86 to route the call to the subscriber's SSP 82 and to begin monitoring the duration of the call.

The SSP 82 detects a Termination Attempt Trigger (TAT) and sends a termination attempt query to the SCP 84. The SCP 84 instructs the SSP 82 to generate an AMA billing record and complete the call to the long distance terminating number, previously dialed on subscriber line 12. The IP 86 receives an answer from the terminating end office SSP 25. Periodically, the IP 86 indicates the elapsed duration of the call to the SCP 84, to which the SCP 84 responds by automatically decreasing the amount of credits in the account 36a as the call progresses.

When the SCP 84 determines that there are only two minutes remaining in account 36a, the SCP 84 instructs the IP 86 to play an announcement on subscriber line 12 that there are two minutes remaining. The SCP 84 then reconnects the subscriber line 12 to the called party line 22. This is preferably repeated with one minute of credits remaining in account 36a.

When the SCP 84 determines that the credits are exhausted, the SCP 84 instructs the IP 84 to end the call. The IP 84 then disconnects the call and indicates on subscriber line 12 that the credits have been exhausted and the call has been ended.

The AIN architecture is well-documented and well-known to those skilled in the art and, except as otherwise described above, the operation of the AIN components shown in FIGS. 1 and 3 is in accordance with published standards. Further, the references herein to these known AIN components are to be considered terms of art, which would implicitly require their known functionality. In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric labels on method steps in the claims below are for convenience of reference by dependent claims, and do not signify a required order of performance of the method steps.

What is claimed is:

1. A method for routing a long distance call, the method comprising:
   a) receiving a destination telephone number dialed by a subscriber on a subscriber line associated with a local service provider;
   b) determining, based on the destination telephone number, that a long distance call is being attempted on the subscriber line;
   c) in response to said step a), sending a query message to a signal control point (SCP) to determine whether a spending limit associated with the subscriber line has been reached; and
   d) routing the long distance call to a long distance carrier selected by the subscriber, based upon said step b), wherein the long distance carrier is capable of providing prepaid calling services and is a different entity than the local service provider.

2. The method of claim 1 wherein said step a) further includes the step of:
   e) detecting an off-hook delay trigger.

3. The method of claim 2 wherein said step a) further includes the step of:
   f) sending a query message to a database in response to said step e) to determine if the call is a long distance call.

4. The method of claim 3 wherein said step f) further includes the step of sending the query to an SCP.

5. The method of claim 1 wherein said steps a–d are performed in an Advanced Intelligent Network.

6. A method for routing a long distance call, the method comprising:
   a) receiving a destination telephone number dialed by a subscriber on a subscriber line associated with a local service provider;
   b) determining, based on the destination telephone number, that a long distance call is being attempted on the subscriber line;
   c) determining, at a service control point, whether a spending limit associated with the subscriber line has been reached;
   d) routing the call to a long distance carrier selected by the subscriber, wherein the long distance carrier is capable of providing prepaid calling services and is a different entity than the local service provider; and
   e) routing the long distance call.

7. The method of claim 6 wherein said step d) includes the steps of:
   decreasing the credit associated with the subscriber line as the long distance call continues;
   comparing the credit to a predetermined threshold.

8. The method of claim 7 further including the step of disconnecting the long distance call based upon a determination that the credit has reached the predetermined threshold.

9. The method of claim 7 further including the step of:
   generating a warning on the subscriber line when the credit reaches the predetermined threshold.

10. The method of claim 6 further including the steps of:
    f) monitoring a duration of the long distance call; and
    g) comparing the duration of the long distance call to the spending limit.

11. A method for routing a long distance call, the method comprising:
    a) receiving a destination telephone number dialed by a subscriber on a subscriber line associated with a local service provider;
    b) determining, based on the destination telephone number, that a long distance call is being attempted on the subscriber line;
    c) determining, at a service control point, whether a spending limit associated with the subscriber line has been reached;
    d) routing the call to a long distance provider selected by the subscriber, wherein the long distance carrier is capable of providing prepaid calling services and is a different entity than the local service provider;
    d) determining whether a spending limit associated with the subscriber line has been reached;
    e) collecting a PIN from the subscriber in response to said step a);
    f) verifying the PIN; and
    g) routing the call in said step c) based upon said step e).

12. An intelligent network system comprising:
    a prepaid account associated with a subscriber line and having a variable level of credit;
    a service switching point (SSP) associated with a local telecommunications service provider and in communication with the subscriber line, wherein the SSP receives an attempted call to a destination telephone number from the subscriber line and generates a query in response to the destination telephone number;
    a service control point (SCP) associated with the local telecommunications service provider and in communication with the SSP, wherein the SCP receives the query from the SSP and determines, based on the query, whether the attempted call is a long distance call, and wherein the SCP determines the level of credit in the prepaid account; and
    a switch in communication with the SCP and SSP, wherein the switch routes the attempted call to a long distance carrier selected by the subscriber, based upon the determination that the attempted call is a long distance call, wherein the long distance carrier is capable of providing prepaid calling services and is a different entity than the local service provider.

13. The intelligent network system of claim 12, wherein the switch is the SSP, and wherein the switch routes the attempted call based upon the level of credit.

14. The intelligent network system of claim 12 wherein the switch is associated with the long distance carrier.

15. The intelligent network system of claim 12, further comprising:
    a prepaid platform associated with the long distance carrier, said SSP routing the attempted call to the prepaid platform based upon the SCP determining if the attempted call is a long distance call.

16. The intelligent network system of claim 13 wherein the SSP sends the query based upon the SSP detecting an off-hook delay trigger on the caller line.

17. The intelligent network system of claim 13 wherein the SSP sends a dialed number, dialed on the subscriber line, to the SCP with the query.

18. The intelligent network system of claim 17 wherein the SCP determines if the call is a long distance call based upon the dialed number.

19. The intelligent network system of claim 13 wherein the SCP monitors the level of credit in the prepaid account during the call.

20. The intelligent network system of claim 13 wherein the SCP generates a disconnect call signal based upon the level of credit.

21. The intelligent network system of clam 13 further including an intelligent peripheral (IP) collecting a access code from the caller line in response to the query.

22. The intelligent network system of claim 21 wherein the SCP verifies the access code and the SSP routes the call based upon the verification of the access code.

23. The intelligent network system of claim 21 wherein the SCP instructs the IP to generate an announcement on the caller line based upon the level of credit.

24. The system of claim 15, further comprising an intelligent peripheral (IP) associated with the long distance provider and in communication with the prepaid platform.

25. The system of claim 12, wherein, after the caller makes a payment to the local service provider, the local service provider pays the long distance carrier.

26. The system of claim 15, wherein the prepaid account is periodically replenished by the prepaid platform when the caller makes a payment to the local service provider.

27. The system of claim 15, wherein the prepaid platform collects an access code from the caller line.

28. The intelligent network system of claim 27 wherein the prepaid platform verifies the access code and routes the attempted call based upon the verification of the access code.

29. An intelligent network system comprising:
   a service switching point (SSP) associated with a local telecommunications service provider and in communication with a caller line, wherein the SSP receives an attempted call to a destination telephone number from the caller line and generates a query in response to the attempted call from the caller line;
   a prepaid account associated with the caller line and having a variable level of credit; and
   a service control point (SCP), associated with a local telecommunications provider and in communication with the SSP, wherein the SCP receives the query from the SSP and instructs the SSP to route the attempted call to a long distance carrier selected by the caller, based upon the level of credit in the prepaid account wherein the long distance carrier is a different entity than the local service provider and is capable of providing prepaid calling services.

30. The intelligent network system of claim 29 wherein the SSP sends the query based upon the SSP detecting an off-hook delay trigger on the caller line.

31. The intelligent network system of claim 29 wherein the SSP sends a dialed number dialed on the caller line, to the SCP with the query.

32. The intelligent network system of claim 31 wherein the SCP determines if the call is a long distance call based upon the dialed number.

33. The intelligent network system of claim 29 wherein the SCP monitors the level of credit in the prepaid account during the call.

34. The intelligent network system of claim 33 wherein the SCP generates a disconnect call signal based upon the level of credit.

35. The intelligent network system of claim 29 fixer including an intelligent peripheral (IP) collecting a access code from the caller line in response to the query.

36. The intelligent network system of claim 35 wherein the SCP verifies the access code and the SSP routes the attempted call based upon the verification of the access code.

37. The intelligent network system of claim 36 wherein the SCP instructs the IP to generate an announcement on the caller line based upon the level of credit.

38. The intelligent network system of claim 29 further including an intelligent peripheral (IP) monitoring the duration of the long distance call.

39. The intelligent network system of claim 38 wherein the SCP instructs the IP to monitor the duration of the long distance call.

40. The intelligent network system of claim 38 wherein the IP instructs the SCP to change the level of credit in the prepaid account based upon the duration of the long distance call.

41. The intelligent network system of claim 40 wherein the SCP monitors the level of credit in the prepaid account during the long distance call.

42. The intelligent network system of claim 41 wherein the SCP instructs the IP to end the long distance call based upon the level of credit in the prepaid account.

* * * * *